United States Patent
Carnevale et al.

(10) Patent No.: US 10,584,237 B2
(45) Date of Patent: Mar. 10, 2020

(54) MODIFIED POLYPROPYLENE AND POLYMER BLENDS THEREOF

(71) Applicant: Braskem America, Inc., Philadelphia, PA (US)

(72) Inventors: Elliot Carnevale, Pittsburgh, PA (US); Riley Stevens, Pittsburgh, PA (US); Kimberly Miller McLoughlin, Pittsburgh, PA (US); William Scott Miller, Pittsburgh, PA (US); Michael Robert Stephans, Pittsburgh, PA (US); Steven Michael Krupinski, Pittsburgh, PA (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 15/544,152

(22) PCT Filed: Jan. 15, 2016

(86) PCT No.: PCT/US2016/013580
§ 371 (c)(1),
(2) Date: Jul. 17, 2017

(87) PCT Pub. No.: WO2016/122909
PCT Pub. Date: Aug. 4, 2016

(65) Prior Publication Data
US 2018/0022906 A1    Jan. 25, 2018

Related U.S. Application Data

(60) Provisional application No. 62/110,120, filed on Jan. 30, 2015.

(51) Int. Cl.
| C08L 23/12 | (2006.01) |
| C08J 9/00 | (2006.01) |
| C08J 5/18 | (2006.01) |
| C08K 5/43 | (2006.01) |

(52) U.S. Cl.
CPC ............ *C08L 23/12* (2013.01); *C08J 5/18* (2013.01); *C08J 9/0033* (2013.01); *C08J 9/0061* (2013.01); *C08K 5/43* (2013.01); *C08J 2201/03* (2013.01); *C08J 2205/00* (2013.01); *C08J 2323/12* (2013.01); *C08J 2323/32* (2013.01); *C08J 2423/12* (2013.01); *C08L 2205/025* (2013.01); *C08L 2205/03* (2013.01); *C08L 2205/035* (2013.01); *C08L 2205/06* (2013.01)

(58) Field of Classification Search
None
See application file for complete search history.

(56) References Cited

U.S. PATENT DOCUMENTS

| 5,986,009 | A | 11/1999 | Thoen et al. |
| 6,204,348 | B1 | 3/2001 | Raetzsch et al. |
| 6,433,109 | B1 | 8/2002 | Raetzsch et al. |
| 6,472,473 | B1 | 10/2002 | Ansems et al. |
| 6,649,666 | B1 | 11/2003 | Read et al. |
| 6,800,669 | B2 * | 10/2004 | Thoen ............... C08J 9/141 521/143 |
| 6,939,919 | B2 * | 9/2005 | Tau ............... C08L 23/0815 525/191 |
| 7,235,606 | B2 * | 6/2007 | Spencer ............... C08K 7/14 525/191 |
| 8,404,324 | B2 | 3/2013 | Lutz |
| 2002/0151611 | A1 | 10/2002 | Thoen et al. |
| 2003/0069362 | A1 * | 4/2003 | Ramanathan ......... C08L 23/10 525/240 |
| 2004/0122196 | A1 | 6/2004 | Pierini et al. |
| 2007/0278717 | A1 | 12/2007 | Novak et al. |
| 2010/0048792 | A1 | 2/2010 | Findlayson et al. |
| 2011/0256333 | A1 | 10/2011 | Lutz et al. |
| 2012/0157599 | A1 | 6/2012 | Doufas |
| 2013/0085234 | A1 | 4/2013 | Harris et al. |
| 2013/0129950 | A1 * | 5/2013 | Hersche ............... C08L 23/06 428/35.7 |
| 2014/0107274 | A1 | 4/2014 | Salek et al. |
| 2014/0194577 | A1 | 7/2014 | Dias et al. |
| 2014/0378601 | A1 | 12/2014 | Jin et al. |

FOREIGN PATENT DOCUMENTS

| JP | 2003535175 A | 11/2003 |
| JP | 2005504160 A | 2/2005 |
| WO | WO0140374 A2 | 6/2001 |
| WO | WO01/92403 A2 | 12/2001 |
| WO | 0234824 A2 | 5/2002 |

OTHER PUBLICATIONS

ASTM D790-02 (ASTM International) Jun. 2002 (Jun. 2002) p. 146-151.
International Search Report for International Application No. PCT/US2016/013580, dated Mar. 30, 2016.
Written Opinion for International Application No. PCT/US2016/013580, dated Mar. 30, 2016.
Search Report and Written Opinion issued in connection with corresponding International Preliminary Patent Application No. PCT/US2016/015580, dated Apr. 7, 2016, 8 pages.

* cited by examiner

*Primary Examiner* — Satya B Sastri

(57) ABSTRACT

A propylene-based polymer composition is characterized by a melt strength at 190° C. of at least 20 cN, a melt drawability at 190° C. of at least 100 mm/s, and a flexural modulus at room temperature of at least 240,000 psi. The propylene-based polymer composition includes a propylene-based polymer resin having a crystallinity of at least 50% coupled with a poly(sulfonyl azide).

27 Claims, No Drawings

MODIFIED POLYPROPYLENE AND POLYMER BLENDS THEREOF

CROSS-REFERENCE TO RELATED APPLICATIONS

This international patent application claims priority to copending U.S. Provisional Patent Application No. 62/110,120, filed on Jan. 30, 2015. The content of U.S. Provisional Patent Application No. 62/110,120 is incorporated by reference into this international patent application.

BACKGROUND

Synthetic polymeric materials such as polypropylene resins are widely used in the production of bulk plastic materials. Bulk plastic materials comprising polypropylene and other thermoplastic resins are used for the manufacture of a variety of products such as molded, extruded, cast, or thermoformed articles.

SUMMARY

This specification describes propylene-based polymer compositions. The propylene-based polymer compositions are characterized by improved melt rheology and improved melt strength.

In one example, a propylene-based polymer composition comprises a propylene-based polymer resin and a poly(sulfonyl azide). The propylene-based polymer composition has a melt strength at 190° C. of at least 20 cN, a melt drawability at 190° C. of at least 100 mm/s, and a flexural modulus at room temperature of at least 240,000 psi.

In another example, a propylene-based polymer composition comprises a propylene-based polymer resin having a crystallinity of at least 50% and at least 500 ppm of a poly(sulfonyl azide), based on the total weight of the propylene-based polymer composition. The propylene-based polymer composition has a melt strength at 190° C. of at least 20 cN, a melt drawability at 190° C. of at least 100 mm/s, and a flexural modulus at room temperature of at least 240,000 psi.

In another example, a propylene-based polymer composition comprises 20-80% (by total weight of the composition) of a poly(sulfonyl azide)-coupled propylene-based polymer resin, and 20-80% (by total weight of the composition) of an uncoupled homopolymer propylene resin. The poly(sulfonyl azide)-coupled propylene-based polymer resin comprises 90-99% (by total weight of the poly(sulfonyl azide)-coupled propylene-based polymer resin) of a homopolymer propylene resin having a crystallinity of at least 50%, 1-10% (by total weight of the poly(sulfonyl azide)-coupled propylene-based polymer resin) of a copolymer resin comprising a copolymer of ethylene and propylene, and 1000-2000 ppm (by total weight of the poly(sulfonyl azide)-coupled propylene-based polymer resin) of a poly(sulfonyl azide). The propylene-based polymer composition has a melt strength at 190° C. of at least 20 cN, a melt drawability at 190° C. of at least 145 mm/s, an Izod impact resistance at room temperature (measured according to ASTM D256-10e1) of greater than or equal to 1.20 ft-lb/in, and a flexural modulus at room temperature of at least 240,000 psi.

In another example, a method of producing a propylene-based polymer composition comprises melting a propylene-based polymer resin and mixing, in a single extrusion step, the molten propylene-based polymer resin and a poly(sulfonyl azide). The mixing produces a coupled propylene-based polymer composition having a melt strength at 190° C. of at least 20 cN, a melt drawability at 190° C. of at least 100 mm/s, and a flexural modulus at room temperature of at least 240,000 psi.

In another example, a method of producing a propylene-based polymer composition comprises melting a propylene-based polymer resin having a crystallinity of at least 50% and mixing, in a single extrusion step, the molten propylene-based polymer resin and at least 500 ppm of a poly(sulfonyl azide), based on the total weight of the propylene-based polymer composition. The mixing produces a coupled propylene-base polymer composition having a melt strength at 190° C. of at least 20 cN, a melt drawability at 190° C. of at least 100 mm/s, and a flexural modulus at room temperature of at least 240,000 psi.

It is understood that the inventions described in this specification are not limited to the examples summarized in this Summary.

DESCRIPTION

The following definitions and analytical methods are used in this specification:

The term "polymer" refers to a polymeric compound prepared by polymerizing monomers, whether of the same or a different type. The generic term "polymer" thus embraces the term "homopolymer," referring to polymers prepared from only one type of monomer; "copolymer" and "interpolymer," referring to polymers prepared from two or more different monomers; and physical blends of polymers, which are compositions comprising two or more polymers that have different monomeric contents and/or polymeric structures.

The term "propylene-based polymer" means polymer comprising greater than 50% by weight per molecule of monomeric units derived from propylene monomer. This includes polypropylene homopolymers or copolymers (meaning units derived from two or more comonomers), as well as blends of polymers where polypropylene homopolymer is the matrix phase of the blend.

The term "propylene-based polymer resin" means a macroscopic mass of material comprising a plurality of propylene-based polymer molecules, as opposed to the individual microscopic polymer molecules. The term "propylene-based polymer composition" means a composition comprising a propylene-based polymer resin.

The term "alpha-olefin" or "α-olefin" includes alkenes having a carbon-carbon double bond between a first and second carbon atom in the molecule. Examples of alpha-olefins include, but are not limited to 1-butene, 1-pentene, 1-hexene, 1-heptene, 1-octene, 1-nonene, 1-decene, 1-undecene, and 1-dodecene, including combinations of any thereof.

The term "coupled polymer" means a partially cross-linked polymer resulting from a coupling reaction between a thermoplastic polymer and a coupling agent such as, for example, a poly(sulfonyl azide). Coupled polymers are not thermoset polymer, but are instead thermoplastic polymers having modified rheology characterized by an increased resistance of the molten polymer to flow, which can be measured by the relative melt flow rates of the polymer resin before and after a coupling reaction.

The term "poly(sulfonyl azide)" means a compound comprising two or more covalently-bonded sulfonyl azide groups (—SO$_2$N$_3$). Poly(sulfonyl azides) include bis(sulfonyl azide) compounds comprising two sulfonyl azide groups:

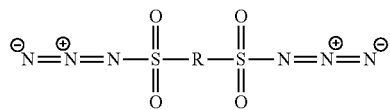

Wherein R is an unsubstituted or inertly substituted hydrocarbyl, hydrocarbyl ether, or silicon-containing group. The R group may have sufficient carbon, oxygen, and/or silicon atoms to separate the sulfonyl azide groups sufficiently to permit a facile reaction between propylene-based polymer molecules and the sulfonyl azide, as described below. While there is no critical limit to the length of the R group, each R group has at least one carbon or silicon atom between the sulfonyl azide groups, and may have less than about 50, less than about 20, or less than about 15 carbon, oxygen, and/or silicon atoms. Silicon-containing groups include silanes and siloxanes. The term "inertly substituted" refers to substitution with atoms or groups which do not undesirably interfere with coupling reactions or desired properties of the resulting coupled polymers. The R group may comprise an aryl, alkyl, aryl alkaryl, arylalkyl silane, siloxane, or heterocyclic group, or other groups which are inert toward propylene-based polymer molecule, and which separate the sulfonyl azide groups as described. Poly(sulfonyl)azides include compounds such as, for example, 1,5-pentane bis(sulfonyl azide); 1,8-octane bis(sulfonyl azide); 1,10-decane bis(sulfonyl azide); 1,10-octadecane bis(sulfonyl azide); 1-octyl-2,4,6-benzene tris(sulfonyl azide); 4,4'-diphenyl oxide bis (sulfonyl azide); 1,6-bis(4'-sulfonazido-phenyl)hexane; 2,7-naphthalene bis(sulfonyl azide); and mixed sulfonyl azides of chlorinated aliphatic hydrocarbons containing an average of from 1 to 8 chlorine atoms and from 2 to 5 sulfonyl azide groups per molecule, and combinations of any thereof. For example, 4,4'-diphenyl oxide bis(sulfonyl azide) (DPOBSA) is an exemplary poly(sulfonyl azide):

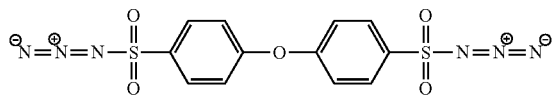 [SMILES: [N-]=[N+]=NS(=O)(=O)c1ccc(Oc2ccc(S(=O)(=O)N=[N+]=[N-])cc2)cc1]

The term "melt flow rate" or "MFR" refers to a measure of melt viscosity determined according to ASTM D1238-10 (230° C., 2.16 kg): Standard Test Method for Melt Flow Rates of Thermoplastics by Extrusion Plastometer. Melt flow rates are reported in units of grams-per-10-minutes (g/10 min.) or decigrams-per-minute (dg/min.).

The term "crystallinity" refers to the percentage crystallinity of a polymer sample measured using differential scanning calorimetry (DSC) according to the following equation:

$$\% \text{ crystallinity} = \frac{\Delta H_m - \Delta H_c}{\Delta H_m^\circ}(100);$$

wherein $\Delta H_m$ is the heat of melting determined via DSC measurement, $\Delta H_c$ is the heat of cold crystallization determined via DSC measurement, and $\Delta H_m^\circ$ is the heat of melting for a 100% crystalline polymer reference. For example, the $\Delta H_m^\circ$ value for 100% crystalline polypropylene homopolymer is 207.1 J/g, and the $\Delta H_m^\circ$ value for 100% crystalline polyethylene homopolymer is 293.6 J/g. The $\Delta H_m^\circ$ values for a propylene-ethylene copolymer can be determined from the values for the respective homopolymers using a linear rule of mixing based on the weight fraction (X) of each monomer type forming the copolymer:

$$\Delta H_m^\circ{}_{(copolymer)} = (207.1 \text{ J/g})(X_{ethylene}) + (293.6 \text{ J/g})(X_{propylene})$$

Similarly, the $\Delta H_m^\circ$ values for copolymers comprising different monomers and/or more than two monomers can be determined from the values $\Delta H_m^\circ$ for homopolymers consisting of the respective monomers using a linear rule of mixing based on the weight fraction (X) of each monomer type forming the copolymer:

$$\Delta H_m^\circ{}_{(copolymer)} = [\Delta H_m^\circ{}_{(monomer-1)}][X_{monomer-1}] + [\Delta H_m^\circ{}_{(monomer-2)}][X_{monomer-2}] + \ldots$$

The heat of melting ($\Delta H_m$) and the heat of cold crystallization ($\Delta H_c$) of a polymer sample are determined according to ASTM E793-06 (2012): Standard Test Method for Enthalpies of Fusion and Crystallization by Differential Scanning calorimetry.

The term "melting temperature" means the melting point temperature of a polymer sample as determined according to ASTM E794-06 (2012): Standard Test Method for Melting And Crystallization Temperatures By Thermal Analysis.

The term "melt strength" means the maximum tensile strength of an extruded molten polymer sample measured using a "Rheotens" tensile tester as described in Meissner, Rheol. Acta, 10, 1971, pp. 230-242. Melt strength values described in this specification were measured using a RHEO-TESTER 2000 high-pressure capillary rheometer equipped with a RHEOTENS 71.97 unit, both available from Göettfert Werkstoff-Prüfmaschinen GMBH, Buchen, Germany, operated in accordance with ASTM D3835-08: Standard Test Method for Determination of Properties of Polymeric Materials by Means of a Capillary Rheometer. A 12 millimeter capillary barrel was used at a barrel temperature of 190° C. The molten polymer was soaked at the 190° C. test temperature for 5 minutes prior to the test. A molten polymer strand was pushed through a 20 millimeter/2 millimeter (length/diameter) capillary die with a 180° entrance angle at an apparent wall shear rate of about 86 s$^{-1}$. The polymer strand was then fed into the RHEOTENS 71.97 unit and grabbed by tandem pulley system comprising two sets of two pull-off wheels. The wheel speed was adjusted to reduce the acting force on the polymer strand to approximately zero. Once steady-state was achieved, the speed of the counter-rotating pull-off wheels was continuously increased, thereby stretching the polymer strand until fracture and/or slippage. The force exerted on the polymer strand by the accelerating pull-off wheels was measured by the RHEOTENS 71.97 unit and the maximum force recorded during the test was identified as the "melt strength" of the polymer sample, reported in units of centi-Newtons (cN).

The term "melt drawability" means the maximum velocity of a molten polymer strand pulled through a RHEOTENS 71.97 unit before breakage during a melt strength test as described above. As described above, the "melt strength" of a polymer sample is defined as the maximum force required to uniaxially stretch a molten strand of the polymer sample before it breaks in a "Rheotens" tensile tester with accelerating pull-off wheels. During the melt strength test, both the increasing tensile force exerted on the polymer strand and the increasing velocity of the polymer strand through the pull-off wheels were measured. The maximum velocity recorded during the test was identified as the "melt drawability" of the polymer sample, reported in units of millimeters-per-second (minis).

The term "flexural modulus" means the ratio of stress to strain of a solid polymer sample in flexural deformation as measured according to ASTM D790-10: *Standard Test Methods for Flexural Properties of Unreinforced and Reinforced Plastics and Electrical Insulating Materials.*

The terms "heat distortion temperature" and "distortion temperature under load" mean the temperature at which a flexural loaded solid polymer sample deforms, as measured according to ASTM D648-07: *Standard Test Method for Deflection Temperature of Plastics Under Flexural Load in the Edgewise Position.*

Thermoplastic materials such as polystyrene are useful for the production of molded, extruded, cast, or thermoformed products. For example, the solid material properties (e.g., flexural modulus), melt rheology, and melt strength of polystyrene resins make polystyrene a choice material for the production of flexible and rigid packaging (e.g., extruded sheets, cast films, and multi-layer sheet and film structures). These material properties provide for relatively easy melt processing (e.g., extrusion, injection molding, blow molding, and the like). However, compared to other thermoplastic materials, such as, for example, propylene-based polymer resins, polystyrene resins are relatively expensive. Conversely, less expensive thermoplastic materials, such as, for example, propylene-based polymer resins, generally have molten material properties (e.g., melt strength, drawability, and the like) that result in inferior melt processability compared to polystyrene resins.

The propylene-based polymer composition described in this specification may be characterized by improved melt rheology and improved melt strength, which give the composition improved melt processability comparable to or better than polystyrene resins, while still maintaining the advantage of being less expensive than polystyrene resins. Accordingly, the propylene-based polymer composition described in this specification may provide an excellent substitute for polystyrene resins in the production of flexible and rigid packaging (e.g., extruded sheets, cast films, and multi-layer sheet and film structures), and other formed articles produced using melt processing methods such as, for example, extrusion, injection molding, blow molding, and the like. For example, the propylene-based polymer composition described in this specification can be used for the production of single-layer and multi-layer sheets and films that are readily thermoformable into flexible or rigid articles, such as, for example, flexible or rigid packaging substrates.

The propylene-based polymer composition may comprise a propylene-based polymer resin and a poly(sulfonyl azide). The poly(sulfonyl azide) reacts with the polymers of the propylene-based polymer resin to produce coupled polymers. Thus, the propylene-based polymer composition can comprise a poly(sulfonyl azide)-coupled propylene-based polymer resin.

The propylene-based polymer resin may have a crystallinity of at least 50%. The poly(sulfonyl azide) may be present in the propylene-based polymer composition in an amount of at least 500 ppm based on the total weight of the composition. The propylene-based polymer composition may have a melt strength at 190° C. of at least 20 cN, a melt drawability at 190° C. of at least 100 mm/s, and a flexural modulus at room temperature of at least 240,000 psi. The propylene-based polymer composition may have a melting temperature of at least 140° C.

The propylene-based polymer resin may comprise polypropylene homopolymers. Alternatively, the propylene-based polymer resin may comprise copolymers comprising a polymerization product of propylene and ethylene. The propylene-based polymer resin may comprise copolymers comprising a polymerization product of propylene and one or more α-olefins. For example, the propylene-based polymer resin may be produced from propylene monomers and, optionally, ethylene and/or one or more α-olefin monomers, such as, for example, 1-butene, 1-pentene, 1-hexene, 1-heptene, 1-octene, 1-nonene, 1-decene, 1-undecene, and/or 1-dodecene. Propylene-based polymer resins comprising copolymers comprising one or more α-olefin comonomers may comprise any combination of one or more α-olefin comonomers selected from the group consisting of 1-butene, 1-pentene, 1-hexene, 1-heptene, 1-octene, 1-nonene, 1-decene, 1-undecene, and 1-dodecene. In examples where the propylene-based polymer resin comprises propylene/ethylene copolymers or propylene/cc-olefin copolymers, the copolymers may comprise greater than 50% propylene comonomer, and less than 50% ethylene and/or α-olefin comonomer, by weight based on the total comonomer weight of the copolymers. For example, a propylene-based copolymer resin can comprise from 51% to 99% propylene comonomer, and from 1% to 49% ethylene and/or α-olefin comonomer, by weight based on the total comonomer weight of the copolymers, or any sub-ranges subsumed therein, such as, for example, 55-99% propylene and 1-45% ethylene and/or α-olefin, 65-99% propylene and 1-35% ethylene and/or α-olefin, 75-99% propylene and 1-25% ethylene and/or α-olefin, 85-99% propylene and 1-15% ethylene and/or α-olefin, 55-95% propylene and 5-45% ethylene and/or α-olefin, 65-85% propylene and 15-35% ethylene and/or α-olefin, 75-85% propylene and 15-25% ethylene and/or α-olefin, or 75-95% propylene and 5-25% ethylene and/or α-olefin.

The propylene-based polymer resin may be produced using a gas phase polymerization process. For example, propylene monomer reactant (with optional ethylene and/or α-olefin comonomer reactants) may be fed into a fluidized bed reactor where the reactants contact a polymerization catalyst, such as, for example, a Ziegler-Natta polymerization catalyst. Suitable Ziegler-Natta polymerization catalysts include non-metallocene Ziegler-Natta catalysts, homogeneous or heterogeneous Ziegler-Natta catalysts, and supported Ziegler-Natta catalysts, and including any necessary co-catalysts. Suitable catalysts include Ziegler-Natta catalyst systems for use in Unipol and Spheripol type polymerization processes, for example. Such catalyst systems can include, but are not limited to, SHAC® and CONSISTA® catalyst systems (available from W.R. Grace & Co., Columbia, Md., USA).

The propylene-based polymer resin may have a crystallinity of at least 50%, or any sub-range subsumed therein, such as, for example, 50-99%, 50-95%, 50-90%, 50-80%, 60-99%, 60-95%, 60-90%, 60-80%, 70-99%, 70-95%, 70-90%, or 70-80%. The propylene-based polymer resin may have a melt flow rate of at least 1.8 g/10 minutes, such as, for example, 1.8-50.0 g/10 minutes, or any sub-range subsumed therein, such as, for example, 2.0-50.0 g/10 minutes, 5.0-40.0 g/10 minutes, 10.0-40.0 g/10 minutes, 15.0-40.0 g/10 minutes, 15.0-30.0 g/10 minutes, or 15.0-25.0 g/10 minutes.

The poly(sulfonyl azide) may comprise at least one bis (sulfonyl azide) compound comprising two sulfonyl azide groups. For example, the poly(sulfonyl azide) may comprise at least one compound of the following formula:

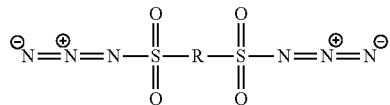

wherein R is an unsubstituted or inertly substituted hydrocarbyl, hydrocarbyl ether, or silicon-containing group. The R group may comprise, for example, an aryl, alkyl, aryl alkaryl, arylalkyl silane, siloxane, or heterocyclic group, or other groups which are inert toward propylene-based polymer molecules.

The poly(sulfonyl)azide may comprise 1,5-pentane bis(sulfonyl azide); 1,8-octane bis(sulfonyl azide); 1,10-decane bis(sulfonyl azide); 1,10-octadecane bis(sulfonyl azide); 1-octyl-2,4,6-benzene tris(sulfonyl azide); 4,4'-diphenyl oxide bis(sulfonyl azide); 1,6-bis(4'-sulfonazido-phenyl) hexane; 2,7-naphthalene bis(sulfonyl azide); mixed sulfonyl azides of chlorinated aliphatic hydrocarbons containing an average of from 1 to 8 chlorine atoms and from 2 to 5 sulfonyl azide groups per molecule, or a combination of any thereof. The poly(sulfonyl)azide may comprise 4,4'-diphenyl oxide bis(sulfonyl azide) (DPOBSA):

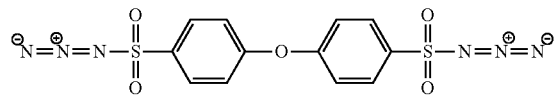

The propylene-based polymer composition may be produced by physically mixing the propylene-based polymer resin and the poly(sulfonyl azide). The propylene-based polymer resin and the poly(sulfonyl azide) can be mixed, for example, in suitable mixing equipment such as V-blenders, ribbon blenders, paddle blenders, tumbling drums, or extruders such as twin-screw extruders or other extrusion devices that extrude pellets or other extrudate forms.

In examples comprising the mixing of the propylene-based polymer resin and the poly(sulfonyl azide) in an extruder, the physical mixing can occur in a single extrusion step. For example, the propylene-based polymer resin and the poly(sulfonyl azide) can be mixed with a compounding set-up, such as in the early stages of a twin-screw extruder, and processed through a single reactive extrusion operation in which the propylene-based polymer resin and the poly(sulfonyl azide) react to produce a poly(sulfonyl azide)-coupled propylene-based polymer resin.

The propylene-based polymer resin and the poly(sulfonyl azide) may be physically mixed by simultaneously introducing the propylene-based polymer resin and the poly(sulfonyl azide) into the feed section of an extruder, such as through a main feed hopper or through multiple feeders. Optionally, the poly(sulfonyl azide) may be pre-blended with solid pellets or other solid particles of the propylene-based polymer resin to form a materbatch, and the masterbatch is fed through the feed section of an extruder. Alternatively, the poly(sulfonyl azide) may be added to the extruder downstream of the resin feed zone, such as through a side-feeder.

During extrusion, the mixture of the propylene-based polymer resin and the poly(sulfonyl azide) may be heated to a temperature sufficient to cause the poly(sulfonyl azide) and the polyolefin to react and form the poly(sulfonyl azide)-coupled propylene-based polymer resin. For example, the mixture of the propylene-based polymer resin and the poly(sulfonyl azide) can be heated to a temperature in the range of from 190° C. to 280° C., or any sub-range subsumed therein, such as, for example, 200-275° C., 205-260° C., 205-255° C., 230-255° C., or 240-260° C. The residence time of the mixture of the propylene-based polymer resin and the poly(sulfonyl azide) at the reaction temperature in the extruder can range, for example, from 15 seconds to 60 seconds, or any sub-range subsumed therein, such as, for example, 15-35 second or 15-30 seconds.

The propylene-based polymer composition comprising the poly(sulfonyl azide)-coupled propylene-based polymer resin may exit an extruder or other mixing equipment, and can be cooled, solidified, and pelletized (i.e., made into pellets, granules, or other free-flowable solid form), or immediately melt-blended with other thermoplastic resins. For example, the molten propylene-based polymer composition can be fed from the first extruder or other mixing equipment to a second extruded or other mixing equipment where the propylene-based polymer composition is blended with another thermoplastic resin, such as, for example, an uncoupled polypropylene homopolymer resin and/or an uncoupled copolymer resin comprising a copolymer of ethylene and at least one $C_3$-$C_{12}$ α-olefin comonomer, such as, for example, a propylene comonomer. Alternatively, cooled, solidified, and pelletized propylene-based polymer composition can be re-melted for downstream melt processing such as, for example, blending with other thermoplastic resins and/or producing various intermediate or end-use product forms (e.g., single-layer and multi-layer sheets and films) using various operations (e.g., casting, extruding, molding, and the like). The pelletized propylene-based polymer composition can be stored and transported to a production site for further blending or product production.

The poly(sulfonyl azide) may be present in the propylene-based polymer composition in an amount of at least 500 ppm, based on the total weight of the composition, such as, for example, 500-7500 ppm, or any sub-range subsumed therein, such as, for example, 500-7000 ppm, 500-5000 ppm, 500-4000 ppm, 500-3000 ppm, 500-2000 ppm, 500-1000 ppm, 1000-2000 ppm, 1000-7000 ppm, or 2000-7000 ppm. The propylene-based polymer resin may be mixed with the poly(sulfonyl azide) in a phlegmatized form wherein the poly(sulfonyl azide) can be pre-mixed with an antioxidant compound such as, for example, pentaerythritol tetrakis(3-(3,5-di-tert-butyl-4-hydroxyphenyl)propionate).

The propylene-based polymer composition can have a melt strength at 190° C. of at least 20 cN, such as, for example 20-120 cN, or any sub-range subsumed therein, such as, for example 25-115 cN, 25-100 cN, 30-100 cN, 25-95 cN, 30-80 cN, or 25-75 cN. The propylene-based polymer composition can have a melt drawability at 190° C. of at least 100 mm/s, at least 120 mm/s, at least 125 mm/s, at least 130 mm/s, at least 140 mm/s, at least 150 mm/s, or at least 170 mm/s. The propylene-based polymer composition can have a melt drawability at 190° C. of up to 175 mm/s, up to 185 mm/s, up to 195 mm/s, or up to 200 mm/s. The propylene-based polymer composition can have a melt drawability at 190° C. in the range of 100-200 mm/s, or any sub-range subsumed therein, such as, for example, 120-200 mm/s, 125-175 mm/s, 135-175 mm/s, 140-175 mm/s, 145-175 mm/s, or 140-170 mm/s. The propylene-based polymer composition may have a melting temperature in the range of from 160° C. to 170° C., and a crystallization temperature of at least 120° C. or at least 130° C.

The propylene-based polymer composition may have a melt flow rate of at least 1.8 g/10 minutes, such as, for example, 1.8-50.0 g/10 minutes, or any sub-range subsumed therein, such as, for example, 2.0-50.0 g/10 minutes, 5.0-40.0 g/10 minutes, 10.0-40.0 g/10 minutes, 15.0-40.0 g/10 minutes, 15.0-30.0 g/10 minutes, or 15.0-25.0 g/10 minutes. The propylene-based polymer composition may have a ratio of melt strength to melt flow rate (MS/MFR) that is less than 10 or greater than 18.

As described above, the propylene-based polymer composition comprising the poly(sulfonyl azide)-coupled propylene-based polymer resin can be blended with other thermoplastic resins, such as, for example an uncoupled polypropylene homopolymer resin and/or an uncoupled copolymer resin comprising a copolymer of ethylene and at least one $C_3$-$C_{12}$ α-olefin comonomer, such as, for example, a propylene comonomer. The poly(sulfonyl azide)-coupled propylene-based polymer resin of the propylene-based polymer composition may also comprise a melt blended mixture of a homopolymer propylene resin, a copolymer resin comprising a copolymer of ethylene and propylene, and a poly(sulfonyl azide).

In one example, the poly(sulfonyl azide)-coupled propylene-based polymer resin is melted, an uncoupled polypropylene homopolymer resin is melted, and the molten resins are blended. In another example, the poly(sulfonyl azide)-coupled propylene-based polymer resin is melted, an uncoupled copolymer resin comprising a copolymer of ethylene and at least one $C_3$-$C_{12}$α-olefin comonomer (e.g., a copolymer of ethylene and propylene) is melted, and the molten resins are blended. The blending of the resins may be performed in blending equipment such as, for example, an extruder.

In another example, a mixture comprising a homopolymer propylene resin, a copolymer resin comprising a copolymer of ethylene and propylene, and a poly(sulfonyl azide) is melt blended to produce a poly(sulfonyl azide)-coupled propylene-based polymer resin, and the resulting poly(sulfonyl azide)-coupled propylene-based polymer resin is either melt blended to dry blended with an uncoupled propylene-based polymer resin (e.g., an uncoupled homopolymer polypropylene) or other uncoupled thermoplastic resin.

The propylene-based polymer composition can thus comprise the propylene-based polymer resin, the poly(sulfonyl azide) (i.e., coupling the propylene-based polymer resin), and one or more additional thermoplastic resins, such as, for example, an uncoupled polypropylene homopolymer resin and/or an uncoupled copolymer resin comprising a copolymer of ethylene and at least one $C_3$-$C_{12}$ α-olefin comonomer (e.g., an ethylene-propylene copolymer resin). The propylene-based polymer composition can also comprise the propylene-based polymer resin, a copolymer of ethylene and at least one $C_3$-$C_{12}$ α-olefin comonomer (e.g., an ethylene-propylene copolymer resin), the poly(sulfonyl azide) (i.e., coupling the propylene-based polymer resin and the copolymer of ethylene and at least one $C_3$-$C_{12}$ α-olefin comonomer), and one or more additional thermoplastic resins, such as, for example, an uncoupled polypropylene homopolymer resin. Such blended propylene-based polymer compositions can have a melt strength of at least 20 cN, a melt drawability of at least 100 mm/s, and a flexural modulus of at least 240,000 psi.

The propylene-based polymer composition may comprise the poly(sulfonyl azide)-coupled propylene-based polymer resin in combination with any one or more of an uncoupled homopolymer polypropylene, an uncoupled propylene-ethylene copolymer, an uncoupled propylene-α-olefin copolymer, a coupled propylene-ethylene copolymer, an/or a coupled propylene-α-olefin copolymer. In examples comprising two or more types of polymers (e.g., the poly(sulfonyl azide)-coupled propylene-based polymer resin and an uncoupled homopolymer polypropylene and/or an uncoupled propylene-ethylene copolymer), the coupled and uncoupled components may be blended by melt compounding (e.g., in a twin-screw extruder) or dry blending. Blends of a poly(sulfonyl azide)-coupled propylene-based polymer resin and an uncoupled polymer resin (e.g., uncoupled homopolymer polypropylene and/or an uncoupled propylene-ethylene copolymer) may comprise a weight ratio of coupled polymer resin to uncoupled polymer resin ranging from 1:99 to 99:1, or any sub-range subsumed therein, such as, for example, 5:95 to 95:5, 10:90 to 90:10, 15:85 to 85:15, 20:80 to 80:20, 25:75 to 75:25, 20:80 to 60:40, 20:80 to 50:50, or 20:80 to 40:60.

Accordingly, a propylene-based polymer composition may comprise 1-99% of one or more poly(sulfonyl azide)-coupled propylene-based polymer resin(s), and 1-99% of one or more uncoupled polymer resin(s), based on the total weight of the poly(sulfonyl azide)-coupled propylene-based polymer resin(s) and the uncoupled polymer resin(s). A propylene-based polymer composition may comprise 1-99% of one or more poly(sulfonyl azide)-coupled propylene-based polymer resin(s), or any sub-range subsumed therein, such as, for example, 5-95%, 10-90%, 10-85%, 15-85%, 10-80%, 15-80%, 20-80%, 15-75%, 20-75%, 25-75%, 20-70%, 30-70%, 30-60%, 35-60%, or 35-55%, based on the total weight of the poly(sulfonyl azide)-coupled propylene-based polymer resin(s) and the uncoupled polymer resin(s). A propylene-based polymer composition may comprise 1-99% of one or more poly(sulfonyl azide)-coupled propylene-based polymer resin(s), or any sub-range subsumed therein, such as, for example, 5-95%, 10-90%, 10-80%, 15-80%, 20-80%, 15-75%, 20-75%, 25-75%, 20-70%, 40-80%, 45-75%, or 55-65%, based on the total weight of the poly(sulfonyl azide)-coupled propylene-based polymer resin(s) and the uncoupled polymer resin(s).

A propylene-based polymer composition may comprise a poly(sulfonyl azide)-coupled propylene-based polymer resin (comprising, for example, a melt blended mixture of a homopolymer propylene resin, a copolymer resin comprising a copolymer of ethylene and an α-olefin such as propylene, and a poly(sulfonyl azide)) and an uncoupled homopolymer polypropylene resin. The propylene-based polymer composition may exhibit an Izod impact resistance at room temperature, measured according to ASTM D256-10e1: *Standard Test Methods for Determining the Izod Pendulum Impact Resistance of Plastics*, of greater than or equal to 1.10 foot-pounds-per-inch (ft-lb/in), greater than or equal to 1.15 ft-lb/in, greater than or equal to 1.20 ft-lb/in, greater than or equal to 1.25 ft-lb/in, greater than or equal to 1.30 ft-lb/in, greater than or equal to 1.35 ft-lb/in, or greater than or equal to 1.40 ft-lb/in. The propylene-based polymer composition may exhibit a melt strength at 190° C. of greater than or equal to 20 cN, greater than or equal to 25 CN, greater than or equal to 30 cN, or greater than or equal to 35 cN. The propylene-based polymer composition may exhibit a melt drawability at 190° C. of greater than or equal to 125 mm/s, greater than or equal to 135 minis, greater than or equal to 145 mm/s, greater than or equal to 155 mm/s, or greater than or equal to 165 mm/s. The propylene-based polymer composition may comprise 15-95% of the poly(sulfonyl azide)-coupled propylene-based polymer resin by total weight, or any sub-range subsumed therein, such as, for example, 15-85%, 15-75%, 20-90%, 20-80%, 35-65%, or 40-60%.

A propylene-based polymer composition may comprise a poly(sulfonyl azide)-coupled propylene-based polymer resin (comprising, for example, a melt blended mixture of a homopolymer propylene resin, a copolymer resin comprising a copolymer of ethylene and an α-olefin such as propylene, and a poly(sulfonyl azide)) and an uncoupled homopolymer polypropylene resin. The propylene-based polymer composition may exhibit an Izod impact resistance at room temperature, measured according to ASTM D256-10e1: *Standard Test Methods for Determining the Izod Pendulum Impact Resistance of Plastics*, in the range of 1.10-1.50 ft-lb/in; a melt strength at 190° C. in the range of 20-40 cN; and a melt drawability at 190° C. in the range of 120-170 mm/s (or any sub-ranges subsumed therein). The propylene-based polymer composition may comprise 15-95% of the poly(sulfonyl azide)-coupled propylene-based polymer resin by total weight (or any sub-range subsumed therein)

In examples of the propylene-based polymer composition that comprise an uncoupled homopolymer polypropylene resin and a poly(sulfonyl azide)-coupled propylene-based polymer resin comprising a mixture of a homopolymer propylene resin, a copolymer resin comprising a copolymer of ethylene and an α-olefin such as propylene, and a poly(sulfonyl azide), the poly(sulfonyl azide)-coupled propylene-based polymer resin may comprise (by total weight of the poly(sulfonyl azide)-coupled propylene-based polymer resin) 90-99% of a homopolymer propylene resin having a crystallinity of at least 50%, 1-10% of the copolymer resin, and 500-3000 ppm of the poly(sulfonyl azide) (or any sub-ranges subsumed therein). In such examples, the propylene-based polymer composition may comprise (by total weight of the composition) 20-80% of the poly(sulfonyl azide)-coupled propylene-based polymer resin, and 20-80% of the uncoupled homopolymer propylene resin. As described above, the propylene-based polymer composition may have a melt strength at 190° C. of at least 20 cN, a melt drawability at 190° C. of at least 145 mm/s, an Izod impact resistance at room temperature (measured according to ASTM D256-10e1) of greater than or equal to 1.20 ft-lb/in, and a flexural modulus at room temperature of at least 240,000 psi.

The poly(sulfonyl azide)-coupled propylene-based polymer may be incorporated into an impact copolymer polypropylene (ICP) composition further comprising an uncoupled propylene-ethylene copolymer and/or an uncoupled propylene-α-olefin copolymer. Generally, propylene-based polymers exhibit good heat stability and high chemical resistance, but may exhibit relatively low impact resistance, especially at low temperatures. To address this issue, propylene-based polymers can be incorporated into ICPs in which the propylene-based polymers form a continuous matrix phase and elastomeric propylene-ethylene copolymers and/or elastomeric propylene-α-olefin copolymers for a dispersed rubber phase in the propylene-based polymer matrix.

In ICP compositions comprising a poly(sulfonyl azide)-coupled propylene-based polymer matrix phase and a dispersed rubber phase comprising a propylene-ethylene copolymer and/or a propylene-α-olefin copolymer, the matrix phase may comprise from 50% to 95%, and the dispersed rubber phase may comprise from 5% to 50%, of the ICP composition by weight based on the combined weight of the rubber phase and the matrix phase. The matrix phase may comprise from 50% to 95%, of the ICP composition based on the combined weight of the rubber phase and the matrix phase, or any sub-range subsumed therein, such as, for example, 60-95%, 70-95%, 75-95%, 80-95%, or 85-95%. The dispersed rubber phase may comprise from 5% to 50% of the ICP composition based on the combined weight of the rubber phase and the matrix phase, or any sub-range subsumed therein, such as, for example, 5-40%, 5-30%, 5-25%, 5-20%, or 5-15%.

The dispersed rubber phase of the ICP composition may comprise a propylene-ethylene copolymer. The propylene-ethylene copolymer may comprise from 25% to 95% ethylene monomer, and from 5% to 75% propylene monomer, by weight based on the total comonomer weight of the propylene-ethylene copolymer. The propylene-ethylene copolymer may comprise from 25% to 95% ethylene monomer by weight based on the total comonomer weight of the propylene-ethylene copolymer, or any sub-range subsumed therein, such as, for example, 50-90%, 50-80%, 50-75%, or 55-70%. The propylene-ethylene copolymer may comprise from 5% to 75% propylene monomer by weight based on the total comonomer weight of the propylene-ethylene copolymer, or any sub-range subsumed therein, such as, for example, 10-50%, 20-50%, 25-50%, or 30-45%.

Examples of other polymers suitable for the dispersed rubber phase of the ICP composition are described in U.S. Patent Application Publication Nos. 2014-0194577 A1; 2012-0157599 A1; and 2014-0107274 A1, which are incorporated-by-reference into this specification. These polymers may form the rubber phase dispersed in the matrix phase comprising the poly(sulfonyl azide)-coupled propylene-based polymers described above.

In accordance with the examples described above, the propylene-based polymer composition can comprise a poly (sulfonyl azide)-coupled propylene-based polymer resin and, optionally, a first additional resin (e.g., an uncoupled polypropylene homopolymer resin), a second additional resin (e.g., a coupled or uncoupled resin comprising an ethylene/α-olefin copolymer), and/or a third additional resin (e.g., a coupled or uncoupled resin comprising an ethylene/α-olefin copolymer).

The propylene-based polymer composition comprising the poly(sulfonyl azide)-coupled propylene-based polymer resin, and, optionally, other thermoplastic polymer resins (e.g., in the form of an ICP composition or otherwise), may be blended with various other optional components. For example, a variety of additives may optionally be incorporated for various purposes into the propylene-based polymer composition. Such additives include, for example, antioxidants (e.g., hindered phenols such as Irganox™ 1010, available from the BASF Corporation, and phosphites such as Irgafos™ 168, available from the BASF Corporation), acid scavengers (e.g., calcium stearate), nucleating agents (e.g., NA-11 and NA-71, available from Amfine Corporation, and Hyperform HPN-600ei and HPN-68L, available from Milliken Chemical Co.), mineral fillers (e.g., talc), and antistatic agents/lubricants (e.g., glycerol monostearate). Additional additives include, for example, optical brighteners, stabilizers, cling additives (e.g., polyisobutylene), polymeric processing aids (e.g., Dynamar™5911, available from 3M Corporation, or Silquest™ PA-1, available from Momentive Performance Materials), colorants, clarifiers (e.g., Millad 3988i and Millad NX8000, available from Milliken Chemical Co.), antiblock agents, waxes, antimicrobials, and UV stabilizers. Additives may be blended with the propylene-based polymer composition by co-extrusion, for example, using a twin-screw extruder.

The propylene-based polymer compositions may be used in various applications. For example, the propylene-based polymer compositions can be used to produce single-layer and multi-layer sheets and films, which in turn can be used to produce flexible and rigid packaging substrates. The single-layer and multi-layer sheets and films comprising the propylene-based polymer compositions can be thermoformed to produce flexible or rigid articles, such as, for example, flexible or rigid packaging substrates. The propylene-based polymer compositions also can be used to produce molded or otherwise formed articles using melt processing methods such as, for example, extrusion, injection molding, blow molding, rotomolding, and the like.

EXAMPLES

In the following examples, differential scanning calorimetry was performed by conducting non-isothermal DSC sweeps using a TA Instruments 200 Differential Scanning calorimeter. The specimens were equilibrated at 200° C. for 5 minutes to ensure complete melting. The melt was then cooled to −50° C. at a rate of 10° C./min. The peak temperature of the melt crystallization exotherm was recorded as the crystallization temperature ($T_{mc}$). The specimens were then heated back to 200° C. at a rate of 10° C./min and the peak of the melting endotherm was recorded as the melting point temperature ($T_m$). The reported tensile properties were measured according to ASTM D638-14: *Standard Test Method for Tensile Properties of Plastics*. Other properties were determined as described above.

Examples 1-6

Propylene-based Polymer Compositions Comprising Poly(Sulfonyl Azide)-coupled Propylene-based Polymer Resins Propylene-based polymer compositions comprising poly (sulfonyl azide)-coupled propylene-based polymer resins were produced by twin screw extrusion of the following components:
- a polypropylene homopolymer resin having a melt index of 18 g/10 min. produced using a Ziegler-Natta catalyst;
- a molecular melt containing 4,4'-diphenyl oxide bis(sulfonyl azide) (DPOBSA) phlegmatized in IRGANOX®1010 antioxidant;
- IRGANOX® B225 antioxidant;
- IRGAFOS® 168 antioxidant; and
- calcium stearate.

IRGANOX® 1010 is pentaerythritol tetrakis(3-(3,5-di-tert-butyl-4-hydroxyphenyl)propionate). IRGAFOS® 168 is tris (2,4-di-tert-butylphenyl)phosphite. IRGANOX® B225 is a 50/50 weight percent blend of pentaerythritol tetrakis(3-(3, 5-di-tert-butyl-4-hydroxyphenyl)propionate) (IRGANOX® 1010) and tris(2,4-di-tert-butylphenyl)phosphite (IRGAFOS® 168).

The formulations of Examples 1-6 are shown in Table 1 below. In the table, the row labeled "extruder type" specifies the screw size of the twin-screw extruder (TSE) used to mix the components. "Melt temperature" refers to the measured temperature recorded by a thermocouple inserted into the extruder barrel near the die. "Residence time" is estimated as the amount of time the poly(sulfonyl azide) and polypropylene resin were in contact during melt-mixing. The measured properties of Examples 1-6 are shown in Table 2, below, and are compared to the properties of commercially available polypropylene resins identified as comparative Examples CE1-CE6 and shown in Table 3.

Comparative Example 1 (CE-1) is DAPLOY™ WB140 (available from Borealis AG), which is a structurally isomeric modified polypropylene homopolymer having high melt strength, but low stiffness and low temperature resistance. Comparative Example 2 (CE-2) is INSPIRE™ 6025N (available from Braskem America, Inc.), which is a commercial grade of polypropylene homopolymer that contains an external crystal nucleating agent. Comparative Examples 3 and 4 (CE-3 and CE-4) are linear grades of polypropylene homopolymer with high melt strength and very low melt flow rate. Comparative Example 5 (CE-5) is INSPIRE™ 114 (available from Braskem America, Inc.), a commercial grade of impact copolymer polypropylene (ICP). Comparative Example 6 (CE-6) is a high crystalline polypropylene homopolymer.

Examples 1-6 demonstrate that the inventive propylene-based polymer compositions have higher crystallinity and flexural modulus than commercially available high melt strength polypropylene resin (e.g., DAPLOY™ WB140 (CE-1)). Moreover, Examples 1-5 show that the inventive propylene-based polymer compositions also exhibit significantly higher melt drawability and high melt strength compared to conventional polypropylene resins (e.g., CE-2, CE-3, and CE-4). High stiffness is also shown by the delta H values, flexural modulus, and heat distortion temperature (distortion temperature under load) of the inventive examples.

TABLE 1

Inventive polymer compositions and extrusion parameters

| | Examples | | | | | |
|---|---|---|---|---|---|---|
| | Ex. 1 | Ex. 2 | Ex. 3 | Ex. 4 | Ex. 5 | Ex. 6 |
| polypropylene resin (MFI 18) | 99.15 | 99.15 | 99.18 | 99.33 | 99.33 | 94.34 (MFR 35) |
| VISTAMAXX ™ 7010FL* | 0 | 0 | 0 | 0 | 0 | 5.0 |
| DPOBSA phlegmatized in IRGANOX ® 1010 | 0.65 | 0.65 | 0.65 | 0.55 | 0.55 | 0.55 |
| B225 | 0.15 | 0.15 | 0 | 0 | 0 | 0 |
| IRGAFOS ® 168 | 0 | 0 | 0.12 | 0.07 | 0.07 | 0.07 |
| Calcium stearate | 0.05 | 0.05 | 0.05 | 0.05 | 0.05 | 0.05 |
| Poly(sulfonyl azide), ppm | 1560 | 1560 | 1560 | 1320 | 1320 | 1320 |

TABLE 1-continued

Inventive polymer compositions and extrusion parameters

| | Examples | | | | | |
|---|---|---|---|---|---|---|
| | Ex. 1 | Ex. 2 | Ex. 3 | Ex. 4 | Ex. 5 | Ex. 6 |
| Extruder type | 45 mm TSE | 45 mm TSE | 50 mm TSE | 50 mm TSE | 50 mm TSE | 50 mm TSE |
| Feed location | main hopper | side feeder | side feeder | side feeder | side feeder | side feeder |
| Melt temperature, F. | 405 | 470 | 490 | 490 | 490 | 490 |
| Residence time, sec | 28 | 28 | 19 | 18 | 18 | 18 |

*VISTAMAXX ™ 7010FL, available from Exxon Mobile Chemical Company

TABLE 2

Properties of inventive polymer compositions

| | Ex. 1 | Ex. 2 | Ex. 3 | Ex. 4 | Ex. 5 | Ex. 6 |
|---|---|---|---|---|---|---|
| (BRASKEM ™ Polymer) | Inventive HMS-PP | Inventive HMS-PP | Inventive HMS-PP | Inventive HMS-PP | Inventive HMS-PP | Inventive HMS-PP |
| MFR, dg/min | 1.7 | 1.2 | 0.8 | 1.4 | 2.1 | 3.2 |
| Melt strength, cN | 34 | 40.3 | 52.4 | 55.3 | 43.6 | 45.0 |
| Melt drawability, mm/s | 146 | 153 | 147.7 | 172 | 157.2 | 170.0 |
| Tc (° C.) | 133.8 | 133.8 | 131.2 | 131.4 | 131.4 | 131.3 |
| Tm (° C.) | 163.8 | 162.9 | 163.9 | 163.4 | 163.6 | 164.0 |
| delta Hm (Joules/g) | 107.8 | 112.4 | 105.1 | 111.2 | 110 | 112 |
| Flexural Modulus, sec (psi) | 279,803 | 280,910 | 297,132 | 294,786 | — | 276,090 |
| DTUL@ 66 psi, ° C. | 111 | 114 | 119 | 117 | — | 108.33 |
| Melt strength (cN)/MFR/(dg/min) | 20 | 34 | 66 | 40 | 21 | 14 |
| Melt strength/melt drawability(mm/s) | 0.2 | 0.3 | 0.4 | 0.3 | 0.3 | 0.3 |

TABLE 3

Properties of comparative polypropylene compositions

| | CE-1 | CE-2 | CE-3 | CE-4 | CE-5 | CE-6 |
|---|---|---|---|---|---|---|
| Description | HMS-PP | 2-MFR homopolymer | Fractional MFR homopolymer (contains <1 wt % ethylene) | Fractional MFR homopolymer (containing no ethylene) | HMS-PP | 2-MFR high crystalline homopolymer |
| MFR (dg/min.) | 2.5 | 2.0 | 0.6 | 0.6 | 0.3 | 2.0 |
| Melt strength (cN) | 45.0 | 10.0 | 63.2 | 72.6 | 53.0 | 10.0 |
| Melt extension (mm/s) | 172.2 | 100.0 | 97.3 | 89.8 | 119.0 | 100.0 |
| Tc (° C.) | 128.1 | 133.5 | 116.4 | 124.2 | — | — |
| Tm (° C.) | 158.3 | 162.9 | 158.1 | 162.3 | — | — |
| delta Hm (Joules/gram) | 97.2 | 112.3 | 90.4 | 100.9 | — | — |
| Flexural Modulus, sec (psi) | 239,632 | — | — | — | — | — |
| DTUL@ 66 psi (° C.) | 101 | — | — | — | — | — |
| Melt strength/MFR (cN/(dg/min)) | 18 | 5 | 105 | 121 | 177 | 5.0 |
| Melt strength/melt extension (mm/s) | 0.3 | 0.1 | 0.6 | 0.8 | 0.4 | 0.1 |

Examples 7-19

Propylene-based Polymer Compositions Comprising Blends of Poly(Sulfonyl Azide)-coupled Propylene-based Polymer Resins and Uncoupled Homopolymer Polypropylene Resin Propylene-based polymer compositions were produced by blending a poly(sulfonyl azide)-coupled propylene-based polymer resin and an uncoupled homopolymer polypropylene resin. The poly(sulfonyl azide)-coupled propylene-based polymer resin was produced by melt blending the following components (in percent by total weight):
- 94.34% of a polypropylene homopolymer resin having a melt index of 35 g/10 min. produced using a Ziegler-Natta catalyst;
- 5.0% of VISTAMAXX™ 7010FL (a metallocene-catalyzed isotactic random copolymer of propylene and ethylene, available from the Exxon Mobile Chemical Company);
- 0.55% of a molecular melt containing 726 ppm (by total weight of the molecular melt) of 4,4'-diphenyl oxide bis(sulfonyl azide) (DPOBSA) phlegmatized in IRGANOX® 1010 antioxidant (1320 ppm DPOBSA by total weight of the poly(sulfonyl azide)-coupled propylene-based polymer resin);
- 0.06% of IRGAFOS® 168 antioxidant; and
- 0.05% of calcium stearate.

The poly(sulfonyl azide)-coupled propylene-based polymer resin was blended with a homopolymer polypropylene resin having a nominal melt flow rate of 2.5 g/10 min. (INSPIRE 6025N, available from Braskem America, Inc.) in various proportions, as shown below in Table 4. The poly(sulfonyl azide)-coupled propylene-based polymer resin was blended with an impact copolymer polypropylene resin having a nominal melt flow rate of 0.5 g/10 min. (INSPIRE 114, available from Braskem America, Inc.) in various proportions, as shown below in Table 4. The blend components were ground to a fine powder in a Wiley mill and dry blended for 15 minutes in a Patterson-Kelly V-blender.

TABLE 4

| Example No. | Poly(sulfonyl azide)-coupled propylene-based polymer resin (percent by total weight of the blend) | INSPIRE 6025N (percent by total weight of the blend) | INSPIRE 114 (percent by total weight of the blend) |
|---|---|---|---|
| 7  | 100 | —  | —  |
| 8  | —   | 100 | —  |
| 9  | —   | —  | 100 |
| 10 | 1   | 99 | —  |
| 11 | 5   | 95 | —  |
| 12 | 10  | 90 | —  |
| 13 | 20  | 80 | —  |
| 14 | 40  | 60 | —  |
| 15 | 60  | 40 | —  |
| 16 | 80  | 20 | —  |
| 17 | 25  | —  | 75 |
| 18 | 50  | —  | 50 |
| 19 | 75  | —  | 25 |

The following material properties were measured for the blends and blend components: deflection temperature under load (DTUL)—ASTM D648-07: *Standard Test Method for Deflection Temperature of Plastics Under Flexural Load in the Edgewise Position*; tensile tangent modulus at room temperature—ASTM D638-14: *Standard Test Method for Tensile Properties of Plastics*; flexural modulus (1% secant) at room temperature—ASTM D790-10: *Standard Test Methods for Flexural Properties of Unreinforced and Reinforced Plastics and Electrical Insulating Materials*; Izod impact resistance at room temperature—ASTM D256-10e1: *Standard Test Methods for Determining the Izod Pendulum Impact Resistance of Plastics*; and high speed multiaxial impact energy absorption at room temperature (3.2 mm thick specimens)—ASTM D3763-15: *Standard Test Method for High Speed Puncture Properties of Plastics Using Load and Displacement Sensors*. The material properties are reported below in Tables 5 and 6.

TABLE 5

| Example No. | DTUL (° C.) | Tensile Tangent Modulus (pounds (force) per square inch) | Flexural Modulus (pounds (force) per square inch) | Average Total Energy on Impact (foot-pounds) |
|---|---|---|---|---|
| 7  | 108.33 | 342462 | 276090 | 0.98 |
| 8  | 106.33 | 321322 | 279253 | 1.56 |
| 9  | 76.53  | 238658 | 180852 | 27.1 |
| 10 | 98.23  | 334459 | 277362 | 1.81 |
| 11 | 96.03  | 320626 | 280714 | 2.51 |
| 12 | 103.33 | 322424 | 279853 | 1.79 |
| 13 | 106.67 | 321730 | 279840 | 1.59 |
| 14 | 108.33 | 329780 | 280416 | 1.51 |
| 15 | 97.53  | 335171 | 278165 | 1.12 |
| 16 | 108.67 | 330002 | 267557 | 1.21 |
| 17 | 87.80  | 253557 | 229021 | 26.8 |
| 18 | 93.90  | 272671 | 208704 | 17   |
| 19 | 103.00 | 284888 | 244184 | 10   |

TABLE 6

| Example No. | Izod - Complete Break on Impact (foot-pounds-per-inch) | Izod - Partial Break on Impact (foot-pounds-per-inch) | Izod - no Break on Impact (foot-pounds-per-inch) |
|---|---|---|---|
| 7  | 1.07  | —     | —     |
| 8  | 0.637 | —     | —     |
| 9  | —     | 7.228 (30% of specimens) | 11.682 (70% of specimens) |
| 10 | 0.701 | —     | —     |
| 11 | 0.808 | —     | —     |
| 12 | 1.028 | —     | —     |
| 13 | 1.27  | —     | —     |
| 14 | 1.413 | —     | —     |
| 15 | 1.307 | —     | —     |
| 16 | 1.261 | —     | —     |
| 17 | —     | 5.504 | —     |
| 18 | —     | 3.51  | —     |
| 19 | 1.859 | —     | —     |

As the above results indicate, propylene-based polymer compositions comprising a poly(sulfonyl azide)-coupled propylene-based polymer resin and an uncoupled homopolymer polypropylene resin exhibit synergistically increased Izod impact resistance without any attendant decrease in tensile modulus or flexural modulus. For instance, Table 7 below compares the measured Izod impact resistance values for each blend with the expected Izod impact resistance values for each blend, which correspond to the mass-weighted average of the measured Izod impact resistance values for the two blend components.

TABLE 7

| Example No. | Poly(sulfonyl azide)-coupled propylene-based polymer resin (percent by total weight of the blend) | INSPIRE 6025N (percent by total weight of the blend) | Measured Izod (ft-lb/in.) | Expected Izod (ft-lb/in.) | Synergism (% measured greater than expected) |
|---|---|---|---|---|---|
| 8 | 0 | 100 | 0.637 | — | — |
| 10 | 1 | 99 | 0.701 | 0.641 | 9.30 |
| 11 | 5 | 95 | 0.808 | 0.659 | 22.68 |
| 12 | 10 | 90 | 1.028 | 0.680 | 51.11 |
| 13 | 20 | 80 | 1.27 | 0.724 | 75.51 |
| 14 | 40 | 60 | 1.413 | 0.810 | 74.40 |
| 15 | 60 | 40 | 1.307 | 0.897 | 45.74 |
| 16 | 80 | 20 | 1.261 | 0.983 | 28.23 |
| 7 | 100 | 0 | 1.07 | — | — |

As shown in Table 7, combinations of a poly(sulfonyl azide)-coupled propylene-based polymer resin and an uncoupled homopolymer polypropylene resin exhibit Izod impact resistances that range from about 9% to about 76% greater than the expected Izod impact resistances for the blended resins. Moreover, the increase in the measured Izod impact resistances over the expected Izod impact resistances occurs without any appreciable decrease in stiffness, measured as tensile and flexural moduli, as shown above in Table 5. These results are surprising and unexpected because the improvement in impact toughness is greater than expected under the rule of mixtures, and because stiffness of propylene-based polymer compositions (measured as the materials' moduli) is generally inversely proportional to the impact toughness of propylene-based polymer compositions (measured as the materials' Izod impact resistance).

In addition to the properties described above, the melt strength and melt drawability of Examples 7, 8, and 13-16 were measured using a RHEO-TESTER 2000 high-pressure capillary rheometer equipped with a RHEOTENS 71.97 unit, both available from Göettfert Werkstoff-Prüfmaschinen GMBH, Buchen, Germany, operated in accordance with ASTM D3835-08: *Standard Test Method for Determination of Properties of Polymeric Materials by Means of a Capillary Rheometer*. These properties are reported below in Tables 8 and 9, which also compare the measured values for each blend with the expected values for each blend corresponding to the mass-weighted average of the measured values for the two blend components.

TABLE 8

| Example No. | Poly(sulfonyl azide)-coupled propylene-based polymer resin (percent by total weight of the blend) | INSPIRE 6025N (percent by total weight of the blend) | Measured Melt Strength (cN) | Expected Melt Strength (cN) | Synergism (% measured greater than expected) |
|---|---|---|---|---|---|
| 8 | 0 | 100 | 8.3 | — | — |
| 13 | 20 | 80 | 20.7 | 14.8 | 39.9 |
| 14 | 40 | 60 | 30.3 | 21.2 | 42.9 |
| 15 | 60 | 40 | 35.4 | 27.7 | 27.8 |
| 16 | 80 | 20 | 37.0 | 34.1 | 8.5 |
| 7 | 100 | 0 | 40.6 | — | — |

TABLE 9

| Example No. | Poly(sulfonyl azide)-coupled propylene-based polymer resin (percent by total weight of the blend) | INSPIRE 6025N (percent by total weight of the blend) | Measured Melt Drawability (mm/s) | Expected Melt Drawability (mm/s) | Synergism (% measured greater than expected) |
|---|---|---|---|---|---|
| 8 | 0 | 100 | 118.5 | — | — |
| 13 | 20 | 80 | 148.9 | 130.3 | 12.5 |
| 14 | 40 | 60 | 157.2 | 142.0 | 10.7 |
| 15 | 60 | 40 | 160.4 | 153.8 | 4.3 |
| 16 | 80 | 20 | 166.1 | 165.5 | 0.4 |
| 7 | 100 | 0 | 177.3 | — | — |

Thus, in addition to the surprising and unexpected improvement in impact toughness, combinations of a poly (sulfonyl azide)-coupled propylene-based polymer resin and an uncoupled homopolymer polypropylene resin exhibit melt strengths that range from 8.5% to 39.9% greater than the expected melt strengths for the blended resins, and exhibit melt drawabilities that range from 0.4% to 12.5% greater than the expected melt drawabilities for the blended resins, as shown in Tables 8 and 9. These results indicate that propylene-based polymer compositions comprising a poly (sulfonyl azide)-coupled propylene-based polymer resin and an uncoupled homopolymer polypropylene resin exhibit synergistically increased Izod impact resistance, melt strength, and melt drawability, without y attendant decrease in tensile modulus or flexural modulus.

Aspects of the Invention

Various aspect, features, and characteristics of the invention include, but are not limited to, the following numbered clauses.

1. A propylene-based polymer composition comprising: a propylene-based polymer resin having a crystallinity of at least 50%; and a poly(sulfonyl azide); wherein the propylene-based polymer composition has a melt strength at 190° C. of at least 20 cN, a melt drawability at 190° C. of at least 100 mm/s, and a flexural modulus at room temperature of at least 240,000 psi.

2. The propylene-based polymer composition of clause 1, wherein the propylene-based polymer resin is a polypropylene homopolymer.

3. The propylene-based polymer composition of clause 1 or clause 2, wherein the composition comprises 500 ppm to 3000 ppm of the poly(sulfonyl azide), based on the total weight of the composition.

4. The propylene-based polymer composition of any one of clauses 1-3, wherein the composition comprises 1,000 ppm to 2,000 ppm of the poly(sulfonyl azide), based on the total weight of the composition.

5. The propylene-based polymer composition of any one of clauses 1-4, wherein the propylene-based polymer resin has a crystallinity in the range of from 60% to 90%.

6. The propylene-based polymer composition of any one of clauses 1-5, wherein the propylene-based polymer resin has a crystallinity in the range of from 70% to 80%.

7. The propylene-based polymer composition of any one of clauses 1-6, wherein the composition has a melt strength at 190° C. in the range of from 25 cN to 100 cN.

8. The propylene-based polymer composition of any one of clauses 1-7, wherein the composition has a heat distortion temperature under a load of 66 psi that is greater than 101° C.

9. The propylene-based polymer composition of any one of clauses 1-8, wherein the composition has a melting temperature in the range of from 160° C. to 170° C.

10. The propylene-based polymer composition of any one of clauses 1-9, wherein the composition has a ratio of melt strength to melt flow rate (MS/MFR) that is less than 10.

11. The propylene-based polymer composition of any one of clauses 1-9, wherein the composition has a ratio of melt strength to melt flow rate (MS/MFR) that is greater than 18.

12. The propylene-based polymer composition of any one of clauses 1-11, further comprising a first uncoupled polypropylene homopolymer resin.

13. The propylene-based polymer composition of clause 12, further comprising a second polyolefin resin, wherein the second polyolefin resin comprises a polypropylene homopolymer resin or a resin comprising a copolymer of ethylene and at least one $C_3$-$C_{12}$ α-olefin comonomer.

14. The propylene-based polymer composition of clause 13, further comprising a third uncoupled polyolefin resin, wherein the third uncoupled polyolefin resin comprises a polypropylene homopolymer resin or a resin comprising a copolymer of ethylene and at least one $C_3$-$C_17$ α-olefin comonomer.

15. The propylene-based polymer composition of clause 12, further comprising an additive.

16. The propylene-based polymer composition of clause 12, further comprising a mineral filler.

17. The propylene-based polymer composition of clause 12, wherein the composition exhibits an Izod impact resistance at room temperature, measured according to ASTM D256-10e1, of greater than or equal to 1.20 ft-lb/in.

18. The propylene-based polymer composition of clause 12, wherein the composition exhibits a melt strength at 190° C. of greater than or equal to 30 cN.

19. The propylene-based polymer composition of clause 12, wherein the composition exhibits a melt drawbility at 190° C. of greater than or equal to 145 mm/s.

20. The propylene-based polymer composition of clause 12, wherein the composition comprises 20-80% of the poly(sulfonyl azide)-coupled propylene-based polymer resin by total weight of the composition.

21. The propylene-based polymer composition of any one of clauses 1-12, further comprising an uncoupled copolymer resin comprising a copolymer of ethylene and propylene.

22. The propylene-based polymer composition of any one of clauses 1-12, further comprising a coupled copolymer resin comprising a copolymer of ethylene and propylene.

23. A propylene-based polymer composition comprising:
  20-80% (by total weight of the composition) of a poly (sulfonyl azide)-coupled propylene-based polymer resin, the poly(sulfonyl azide)-coupled propylene-based polymer resin comprising:
    90-99% (by total weight of the poly(sulfonyl azide)-coupled propylene-based polymer resin) of a homopolymer propylene resin having a crystallinity of at least 50%;
    1-10% (by total weight of the poly(sulfonyl azide)-coupled propylene-based polymer resin) of a copolymer resin comprising a copolymer of ethylene and propylene; and
    1000-2000 ppm (by total weight of the poly(sulfonyl azide)-coupled propylene-based polymer resin) of a poly(sulfonyl azide); and
  20-80% (by total weight of the composition) of an uncoupled homopolymer propylene resin;
  wherein the propylene-based polymer composition has a melt strength at 190° C. of at least 20 cN, a melt drawability at 190° C. of at least 145 mm/s, an Izod impact resistance at room temperature (measured according to ASTM D256-10e1) of greater than or equal to 1.20 ft-lb/in, and a flexural modulus at room temperature of at least 240,000 psi.

24. The propylene-based polymer composition of clause 23, wherein the composition comprises 20-80% (by total weight of the composition) of the poly(sulfonyl azide)-coupled propylene-based polymer resin, and 20-80% (by total weight of the composition) of the uncoupled homopolymer propylene resin.

25. A sheet or film comprising the propylene-based polymer composition of any one of clauses 1-24.

26. A thermoformed sheet or film comprising the propylene-based polymer composition of any one of clauses 1-24.

27. A rigid packaging substrate comprising the propylene-based polymer composition of any one of clauses 1-24.

28. A method of producing a propylene-based polymer composition comprising: melting a propylene-based polymer resin having a crystallinity of at least 50%; and mixing, in a single extrusion step, the molten propylene-based polymer resin and a poly(sulfonyl azide); wherein the mixing produces a coupled propylene-based polymer composition having a melt strength at 190° C. of at least 20 cN, a melt drawability at 190° C. of at least 100 mm/s, and a flexural modulus at room temperature of at least 240,000 psi.

29. The method of clause 28, further comprising: solidifying the coupled propylene-based polymer composition; and pelletizing the coupled propylene-based polymer composition.

30. The method of clause 28 or clause 29, further comprising: melting the coupled propylene-based polymer composition; melting an uncoupled polypropylene homopolymer resin; and blending the molten coupled propylene-based polymer composition and the uncoupled molten polypropylene homopolymer resin.

31. The method of clause 28 or clause 29, further comprising: melting the coupled propylene-based polymer composition; melting an uncoupled copolymer resin comprising a copolymer of ethylene and at least one $C_3$-$C_{12}$ α-olefin comonomer; and blending the molten coupled propylene-based polymer composition and the molten uncoupled copolymer resin.

33. The method of clause 31, wherein the uncoupled copolymer resin comprises a copolymer of ethylene and propylene.

Various features and characteristics of the invention are described in this specification to provide an overall understanding of the production and properties of the disclosed compositions and products. It is understood that the various features and characteristics described in this specification can be combined in any suitable manner regardless of whether such features and characteristics are expressly described or illustrated in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements (e.g., 35 U.S.C. § 112(a) and Article 123(2) EPC). The compositions and products described in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description, sufficiency of description, and added matter requirements (e.g., 35 U.S.C. § 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions and products. Further, the use of a singular noun includes the plural, and the use of a plural noun includes the singular, unless the context of the usage requires otherwise.

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference.

What is claimed is:

1. A propylene-based polymer composition comprising:
   a propylene-based polymer resin having a crystallinity of at least 50%;
   a poly(sulfonyl azide); and
   a first uncoupled polypropylene homopolymer resin;
   wherein the propylene-based polymer composition has a melt strength at 190° C. of at least 20 cN, a melt drawability at 190° C. of at least 100 mm/s, a melt flow rate of at least 1.8 g/10min, and a flexural modulus at room temperature of at least 240,000 psi.

2. The propylene-based polymer composition of claim 1, wherein the propylene-based polymer resin is a polypropylene homopolymer.

3. The propylene-based polymer composition of claim 1, wherein the composition comprises 500 ppm to 3000 ppm of the poly(sulfonyl azide), based on the total weight of the composition.

4. The propylene-based polymer composition of claim 1, wherein the composition comprises 1,000 ppm to 2,000 ppm of the poly(sulfonyl azide), based on the total weight of the composition.

5. The propylene-based polymer composition of claim 1, wherein the propylene-based polymer resin has a crystallinity in the range of from 60% to 90%.

6. The propylene-based polymer composition of claim 1, wherein the propylene-based polymer resin has a crystallinity in the range of from 70% to 80%.

7. The propylene-based polymer composition of claim 1, wherein the composition has a melt strength at 190° C. in the range of from 25 cN to 100 cN.

8. The propylene-based polymer composition of claim 1, wherein the composition has a heat distortion temperature under a load of 66 psi that is greater than 101° C.

9. The propylene-based polymer composition of claim 1, wherein the composition has a melting temperature in the range of from 160° C. to 170° C.

10. The propylene-based polymer composition of claim 1, wherein the composition has a ratio of melt strength to melt flow rate (MS/MFR) that is less than 10.

11. The propylene-based polymer composition of claim 1, wherein the composition has a ratio of melt strength to melt flow rate (MS/MFR) that is greater than 18.

12. The propylene-based polymer composition of claim 1, further comprising a second uncoupled polyolefin resin, wherein the second uncoupled polyolefin comprises a polypropylene homopolymer resin or a resin comprising a copolymer of ethylene and at least one $C_3$-$C_{12}$ α-olefin comonomer.

13. The propylene-based polymer composition of claim 12, further comprising a third uncoupled polyolefin resin, wherein the third uncoupled polyolefin resin comprises a polypropylene homopolymer resin or a resin comprising a copolymer of ethylene and at least one $C_3$-$C_{12}$ α-olefin comonomer.

14. The propylene-based polymer composition of claim 1, further comprising an additive.

15. The propylene-based polymer composition of claim 1, further comprising a mineral filler.

16. The propylene-based polymer composition of claim 1, wherein the composition exhibits an Izod impact resistance at room temperature, measured according to ASTM D256-10e1, of greater than or equal to 1.20 ft-lb/in.

17. The propylene-based polymer composition of claim 1, wherein the composition exhibits a melt strength at 190° C. of greater than or equal to 30 cN.

18. The propylene-based polymer composition of claim 1, wherein the composition exhibits a melt drawbility at 190° C. of greater than or equal to 145 mm/s.

19. The propylene-based polymer composition of claim 1, wherein the composition comprises 20-80% of the poly (sulfonyl azide) and the propylene-based polymer resin by total weight of the composition.

20. The propylene-based polymer composition of claim 1, further comprising an uncoupled copolymer resin comprising a copolymer of ethylene and propylene.

21. The propylene-based polymer composition of claim 1, further comprising a coupled copolymer resin comprising a copolymer of ethylene and propylene.

22. A sheet or film comprising the propylene-based polymer composition of claim 1.

23. A thermoformed sheet or film comprising the propylene-based polymer composition of claim 1.

24. A rigid packaging substrate comprising the propylene-based polymer composition of claim 1.

25. A propylene-based polymer composition comprising:
1-99% (by total weight of the composition) of a poly (sulfonyl azide)-coupled propylene-based polymer resin, the poly(sulfonyl azide)-coupled propylene-based polymer resin comprising:
  90-99% (by total weight of the poly(sulfonyl azide)-coupled propylene-based polymer resin) of a homopolymer propylene resin having a crystallinity of at least 50%;
  1-10% (by total weight of the poly(sulfonyl azide)-coupled propylene-based polymer resin) of a copolymer resin comprising a copolymer of ethylene and propylene; and
  1000-2000 ppm (by total weight of the poly(sulfonyl azide)-coupled propylene-based polymer resin) of a poly(sulfonyl azide); and
1-99% (by total weight of the composition) of an uncoupled homopolymer polypropylene resin;
wherein the propylene-based polymer composition has a melt strength at 190° C. of at least 20 cN, a melt drawability at 190° C. of at least 145 mm/s, an Izod impact resistance at room temperature (measured according to ASTM D256-10e1) of greater than or equal to 1.20 ft-lb/in, a melt flow rate of at least 1.8 g/10 min, and a flexural modulus at room temperature of at least 240,000 psi.

26. The propylene-based polymer composition of claim 25, wherein the composition comprises 20-80% (by total weight of the composition) of the poly(sulfonyl azide)-coupled propylene-based polymer resin, and 20-80% (by total weight of the composition) of the uncoupled homopolymer polypropylene resin.

27. The propylene-based polymer composition of claim 1, wherein the melt flow rate of the propylene-based polymer composition is at least 2.1 g/10 min.

* * * * *